2,981,648

ALUMINUM SOLDERING SLURRY

Stanley W. Peterson and Carl W. Danzer, Racine, Wis., assignors to Modine Manufacturing Company, Racine, Wis., a corporation of Wisconsin No Drawing. Filed Dec. 10, 1957, Ser. No. 701,733

12 Claims. (Cl. 148—23)

The invention relates generally to soldering materials and more particularly to a novel flux and bonding composition which is of particular value in the soldering of aluminum.

Much work has been done in the past, particularly in recent years, to obtain efficient means for bonding aluminum both to itself and to other materials, etc., particularly where intricate structures are to be bonded, portions of which are substantially manually inaccessible. Heat exchangers for automotive and other purposes are typical examples of intricate structures in which the use of aluminum in their fabrication has presented problems in connection with the bonding of the elements of such exchangers into an integral structure. Similarly, the difficulty of soldering aluminum due to the usual surface layer of aluminum oxide to which other metals will not adhere, and the attempt to provide suitable fluxing means for removing such layer, has been the subject of a number of patents.

In general, in the use of halogen salts for fluxing purposes in connection with soldering operations, has been known and various fluxing preparations utilizing the same have been developed, some of which have utilized amines, poly-amines, or other derivatives of ammonia. However, none of the prior soldering compositions were practical for soldering or bonding operations involving intricate shapes, particularly where a dipping and heating operation were required in the bonding process as portions of the structure may be inaccessible, so that the efficiency of the bonded joints is dependent substantially entirely on the efficiency of operation of the fluxing and bonding materials in penetrating all joints and wetting all surfaces to receive bonding material, the bonding material, of the joints so formed possessing suitable characteristics as to tensile strength, corrosion resistance, etc.

The present invention has among its objects the production of a soldering material which may be in the form of a slurry or the like, capable of being applied to the assembly to be bonded by simple means such as dipping to effectively pentrate all joints to be bonded and subjected to heat, as for example, in a hot air oven or the like, to bring the bonding material to melting temperature, the fluxing material being effective to provide suitable bonding surfaces.

A further object of the invention is the production of such a bonding material having desirable viscosity characteristics to enable the use thereof in a dipping operation to provide suitable amounts of flux and bonding material throughout the structure at the portions to be bonded, the nature of the slurry or the like being such that the amounts of bonding metal, etc. may be varied over a relatively wide range and at the same time provide the desired consistency in the material without undesirable granulation or other separation of constituents.

Another object of the invention is the production of a bonding and fluxing material which possesses the above desirable characteristics, and at the same time is highly corrosion resistant, particularly with respect to intergranular corrosive action and which will provide a metallic bond which is normally stronger than the aluminum forming the structure being bonded to eliminate any possibility of joint failure in the finished structure.

A further object of the invention is the production of such a soldering material which will retain its activity over relatively long periods of storage or aging, particularly if it is protected from atmospheric moisture, although tests with our novel material having over 20% additional moisture by weight, appeared to have no undesirable effect on the operational efficiency of the material.

The use of aluminum with its relatively very light weight, and at the same time adequate heat transfer characteristics, has rapidly increased in the heat exchanger field, limited to a certain extent by the bonding problems involved as above brought out, presenting and at the same time a problem, particularly in connection with fin structures and the like utilizing very thin elements, as the application of heat during the bonding operation effects an annealing of the aluminum elements, rendering them subject to damage and distortion as a result of the inherent lack of rigidity and stiffness in the annealed metal. To offset this a new material, zinc clad aluminum, has been developed which, however, is costly and it appears that it will continue to be so. Our invention enables the coating of the entire structure with bonding metal during the bonding operation, the light coating of such metal providing additional rigidity and stiffness in the aluminum components to a degree not only offsetting the effect of annealing, but providing more rigidity than the aluminum parts originally possessed prior to the bonding operation.

A further object of the invention is the production of a bonding and fluxing material for aluminmum having such advantages which may be utilized not only for bonding aluminum to itself but may be utilized in bonding aluminum to other metals, as for example, stainless steel, low carbon steel, copper and brass.

Many other objects and advantages of the present invention will be obvious to those skilled in the art from the disclosure herein given.

We have found that an exceptionally efficient soldering and fluxing material, particularly where it is to be employed in the form of a slurry, may be produced by combining suitable bonding metal and fluxing agents, in particular proportions, in a vehicle of one or more designated aliphatic ketones.

Various alcohols have heretofore been employed in connection with aluminum soldering materials, and while these have been suitable for some types of operations, they have been relatively inefficient in operations such as dippings etc. involving the use of the materials in the form of a slurry or the like. Slurries of such materials generally do not provide a smooth syrupy consistency with good dispersion of the materials therein, rather having more of a watery type of appearance with the materials tending to crystallize or become granulated, and settle out of suspension or solution. Obviously in such cases uniform coating of the structure to be bonded and suitable distribution of the bonding and fluxing materials cannot be obtained, particularly in those portions of the device utilizing capillary attraction to effect proper wetting of adjoining surfaces, etc.

Our investigations have disclosed the fact that there would appear to be a relation between those aliphatic ketones which appear usable to achieve improved results and those which are not.

Based on the results of such investigations it would appear that the efficiency of the vehicle employed is related to the molecular weight of the particular ketone, and it would appear that the aliphatic ketones of lower molecular weight are the most efficient. Thus, while it may be possible that some form of ketone of higher molecular weight may have some applicability, our studies would appear to support a conclusion that ketones, at least above a molecular weight of approximately 86 may be generally considered impractical for use as an efficient vehicle for slurries such as here involved.

On this basis, those ketones, not eliminated by the above specification, would primarily include dimethyl ketone having a molecular weight of approximately 58, methyl ethyl ketone, having a molecular weight of approximately 72, diethyl ketone, methyl propyl ketone and methyl isopropyl ketone, all of which have molecular weight of approximately 86. As might be expected, dimethyl and methyl ethyl ketones, having the lowest molecular weights, appear to be the most efficient and thus the most suitable of this group, although the others are capable of providing improved results over previous materials.

Thus, for most efficient results, the vehicle could be more specifically defined as an aliphatic ketone or ketones of molecular weights of approximately 86 or less.

In combining the elements of our composition, investigation indicates that slurries ranging from low to high concentrations of bonding metal and fluxing materials, and thus from low to high viscosity may be obtained by employing the components within the following percentages by weight:

| | Percent |
|---|---|
| Bonding metal | 15 to 60 |
| Aliphatic ketone or ketones of a molecular weight less than approximately 86 | 9 to 50 |
| Fluxing agents | 20 to 55 |

Obviously in determining percentages, the maximum figures specified are not simultaneous maximums, but rather the normal individual maximum, in which case the other constituents would be proportioned accordingly.

Of various metals which will bond with aluminum, zinc has proven to be an exceptionally efficient metal for the present purposes and we normally prefer to use zinc as the main bonding material, preferably adding a small amount of alloying copper therewith as well as small amounts of aluminum and magnesium in particular cases, these alloying metals serving to improve the properties of the bonding metal. The addition of small amounts of copper, aluminum and magnesium to zinc bonding metal to improve the properties thereof is well known in the metallurgy field, particularly in connection with the production of zinc die castings. In connection with the present invention, the bonding metal as well as any alloying metals will normally be utilized in powdered form.

In connection with the fluxing agents, we have found that a very efficient combination comprises halides of the bonding metal and ammonia together with a suitable fluoride. One very highly efficient fluxing agent comprises the combinations of zinc chloride, ammonium chloride and potassium acid fluoride. While other zinc halides may be utilized, as for example, of the other halogens—bromine, iodine and fluorine, from an availability-cost-efficiency standpoint, zinc chloride would appear to be particularly suitable. For similar reasons, we would normally prefer to employ ammonium chloride to one of the other halogens, and in like manner, although other fluorides may be suitable in varying degrees, we prefer to use potassium acid fluoride to complete the fluxing combination. However, sodium fluoride, sodium acid fluoride, ammonium fluoride, ammonium acid fluoride and potassium fluoride may be listed as examples of other suitable fluorine salts.

We have found that exceptional results are obtained with the use of methyl-ethyl ketone, or dimethyl ketone, resulting in a smooth syrupy liquid ideal for use as a dipping slurry, which can be controlled in consistency to sustain in suspension a wide range of metallic bonding powder.

As will be clearly apparent from specific examples given, we have found from numerous tests that the above constituents, which at the present time appear to be those preferred, may be combined within the following approximate ranges by percentages of weight to provide a workable composition.

| | Percent |
|---|---|
| Zinc | 15 to 50 |
| Copper | .5 to 1.5 |
| Aluminum | 0 to 4.0 |
| Magnesium | 0 to 1.5 |
| Methy ethyl ketone | 9 to 50 |
| Zinc chloride | 20 to 45 |
| Ammonium chloride | 2 to 5 |
| Potassium acid fluoride | .5 to 10 |

These percentages provide a range from a very light soldering slurry to a relatively heavy soldering paste.

The following typical examples will illustrate some of the various combinations which may be achieved with the present invention, the percentages given being by weight:

*Example I*

| | Percent |
|---|---|
| Zinc | 38.8 |
| Copper | 1.2 |
| Methyl ethyl ketone | 20.0 |
| Zinc chloride | 35.2 |
| Ammonium chloride | 3.8 |
| Potassium acid fluoride | 1.0 |

The above percentages by weight substantially comprise by volume ten parts of metal powder, ten parts of fluxing agent and five parts of methyl ethyl ketone. High purity zinc powder is preferably employed, and where utilized for a dipping slurry preferably has an initial viscosity, tested with a number 5 zahn cup of twelve seconds. This composition is at present deemed one of the preferred forms of the invention and has proven to be exceptionally efficient in connection with the fabrication of aluminum refrigeration condensers for automobile air conditioners and the like. It will be apparent that this example utilizes a reactive flux which not only provides a cleansing action in the final composition, but also tends to provide zinc flash on the cleansed surface of the aluminum. It has been found that such soldering slurry has an exceptionally high affinity for the oxide film on the metallic aluminum.

In use, the article, as for example, a radiator core, by a very simple operation may be dipped in the slurry, followed by a simple furnace baking operation or the like. It will be apparent that in the dipping operation it is particularly desirable to maintain a homogeneous mixture and hold any powdered materials in suspension, and whereas previous fluxes proved unsatisfactory as a slurry as the mixtures tended to remain granular and settle very quickly, a slurry embodying the present invention has a smooth syrupy consistency throughout a wide range of metallic powder content, resulting in a very effective adequately uniform coating of the object with the material which when placed in a suitable furnace or oven at temperatures normally ranging from 750 degrees F. to 1500 degrees F., a bonded structure of exceptional quality was produced. Structures utilizing the present invention have been bonded in electric and radiant gas ovens, as well as combustion gas circulating ovens, all with exceptional results. Bonding material produced by the present invention has proven to be stronger than the aluminum bonded, and for example, butt joints of .040" by one-half inch aluminum stripping tested in a tensile machine after having been subjected to steam for 116 hours resulted in failure of the aluminum and not the bonding material. Similarly, heat exchange condensers soldered with material embodying the present invention proved stronger than equivalent brazed condensers and flat tube condensers utilizing the present invention have withstood pressures up to 1300 pounds per square inch.

Likewise bonds formed by the present invention have proven to be highly corrosion resistant which factor is of course of particular impartance as solder bonded aluminum tends to be subject to intergranular attack and other types of bonding materials have resulted in bond failure after being subjected to only 24 hours in steam, whereas extensive application of steam has proven to be of little effect on joints formed by means of the present invention, and bonds so fabricated have proven to be stronger than the material bonded.

Example II

Utilizing the same constituents as Example I, a very heavy slurry may be formed by utilizing the following proportions of materials:

| | Percent |
|---|---|
| Zinc | 46.43 |
| Copper | 1.43 |
| Methyl ethyl ketone | 23.8 |
| Zinc chloride | 25 |
| Potassium acid fluoride | .72 |

This composition comprises by volume ten parts powdered metals, six parts fluxing agents and five parts methyl ethyl ketone, and results in a slurry which has a relatively very heavy viscosity or consistency as compared with the first example.

Example III

In the event a composition of lighter consistency than the first example is desired, the following proportions may be utilized to provide a light slurry:

| | Percent |
|---|---|
| Zinc | 27.85 |
| Copper | .84 |
| Methyl ethyl ketone | 23.8 |
| Zinc chloride | 41.8 |
| Ammonium chloride | 4.52 |
| Potassium acid fluoride | 1.19 |

This embodiment comprises by volume six parts powdered metal, ten parts fluxing agents and five parts of methyl ethyl ketone.

Example IV

In those cases where a very light slurry is required or desirable, such a slurry may be produced by utilizing the following proportions:

| | Percent |
|---|---|
| Zinc | 19.4 |
| Copper | .6 |
| Methyl ethyl ketone | 40.0 |
| Zinc fluoride | 35.2 |
| Ammonium chloride | 3.8 |
| Potassium acid fluoride | 1.0 |

Obviously the particular type of slurry to be employed will vary with several factors, including the nature of the bond to be employed, the amount of surface coating to be produced over the structure, the nature of the article to be bonded as to intricacy, particularly as to small crevices, etc.

This example comprises by volume, five parts powdered metals, ten parts fluxing agents and ten parts methyl ethyl ketone.

Example V

In some cases it may be desirable to utilize the present invention in the form of a paste which may be readily achieved by utilizing the constituents in the following proportions:

| | Percent |
|---|---|
| Zinc | 44.1 |
| Copper | 1.36 |
| Methyl ethyl ketone | 9.08 |
| Zinc chloride | 40.0 |
| Ammonium chloride | 4.32 |
| Potassium hydrogen fluoride | 9.08 |

This particular combination comprises by volume ten parts powdered metal, ten parts fluxing agents and two parts methyl ethyl ketone.

In some cases it might be desirable to impart slightly different characteristics in the bonding material, in which case small percentages of aluminum or magnesium, or both, may be alloyed with the zinc and copper.

Example VI

The following composition is generally similar to Example I, with the exception that an additional constituent, magnesium, is used in a small amount and alloyed with the zinc and copper, the particular proportions set forth resulting in a material having

| | Percent |
|---|---|
| Zinc | 36.5 |
| Copper | 1.2 |
| Magnesium | 1.5 |
| Methyl ethyl ketone | 21.0 |
| Zinc chloride | 35.0 |
| Ammonium chloride | 3.8 |
| Potassium acid fluoride | 1.0 |

Example VII

In some cases it may be desirable to add a percentage of aluminum to the composition and the following defines such a composition in proportions which have been proved suitable:

| | Percent |
|---|---|
| Zinc | 34.0 |
| Copper | 1.2 |
| Aluminum | 4.0 |
| Methyl ethyl ketone | 2.0 |
| Zinc chloride | 35.0 |
| Ammonium chloride | 3.8 |
| Potassium acid fluoride | 1.0 |

Example VIII

In this particular embodiment of the invention both aluminum and magnesium are included in small amounts, resulting in a bonding structure which has been proven satisfactory in the following proportions:

| | Percent |
|---|---|
| Zinc | 32.5 |
| Copper | 1.2 |
| Aluminum | 4.0 |
| Magnesium | 1.5 |
| Methyl ethyl ketone | 21.0 |
| Zinc chloride | 35.0 |
| Ammonium chloride | 3.8 |
| Potassium acid fluoride | 1.0 |

All of the examples provide a soldering and fluxing material having the advantages previously discussed, namely, highly efficient bonding action, highly corrosion resistant bonds and high tensile strength.

In general, the use of ketones individually or in combination, other than methyl ethyl ketone in the various examples given, would follow the same total proportions as those set forth in such examples, in view of which examples utilizing such other ketones have not been repeated. However, as will be apparent from the discussion of suitable ketones, the use of the higher molecular weight ketones may reduce the overall efficiency or preferred characteristics of the composition, as compared with those of lower molecular weight, although in some cases it may be found desirable to use a mixture of ketones. Generally, di-methyl and methyl ethyl ketones would be the preferred vehicles, as these two appear to provide more effective results, as they would appear to hold considerably more solids in suspension and solution without crystallization, granulation or undesired separation of the constituents. Thus, in all probability, the other heavier ketones would normally be limited to lighter slurries involving comparatively small amounts of the other materials, and specific examples utilizing such ketones, would normally be limited to slurries such as those of Examples VI and VII.

As previously mentioned, the use of aluminum in heat exchange structures has presented a serious problem in connection with the use of thin aluminum for fins and the like due to the annealing action which takes place in the aluminum when the latter is heated to bonding temperatures. It will be appreciated that where the entire surface of the structure to be bonded is coated with the bonding material of the present invention, as for example by dipping the article in a slurry of the material, such entire surface may be provided with a coating of zinc or zinc alloy, depending upon the metallic constituents in the bonding slurry, resulting in a structure that is actually more rigid following the bonding operation that it was prior thereto even with the annealing that takes place. Obviously, the amount of coating achieved will depend on the amount of metal in the slurry as well as the consistency or viscosity of the slurry, whereby a thicker coating of material would be initially applied to the structure, resulting in an increase in the amount of metal following heating of the structure. It therefore, is quite possible that the present invention may have considerable merit and application, not only to bonding operations but to some types of coating operations not involving simultaneous bonding between individual elements.

It will be noted from the above description that we have provided a novel material, by means of which aluminum may be bonded to itself or to other metals, particularly in intricate shapes and the like in which case the material can be applied by simple dipping operations, and resulting in a highly corrosion resistant bond which is stronger than the aluminum which it joins. At the same time, if desired, a coating of the entire surface structure of the object with suitable metal may be effected, all of the bonding or coating results capable of achievement in a single simple fluxing operation, followed by the application of heat to the structure.

Having thus described our invention, it is obvious that various immaterial modifications may be made in the same without departing from the spirit of our invention; hence we do not wish to be understood as limiting ourselves to the exact arrangement and combination of ingredients and parts herein shown and described, or uses mentioned.

What we claim as new and desire to secure by Letters Patent is:

1. A bonding material comprising a metallic bonding material consisting essentially of zinc and one or more alloying metals selected from the group consisting of copper, aluminum, and magnesium, said metals being substantially within the range specified by weight of from 15% to 60%; a vehicle of one or more ketones selected from the group consisting of methyl ethyl ketone, diethyl ketone, dimethyl ketone, methyl propyl ketone, and isopropyl ketone within substantially the range specified by weight of 9% to 50%; and a fluxing agent comprising a zinc halide, an ammonium halide selected from the group consisting of chlorine, iodine, and bromine; and a fluorine salt selected from the group consisting of sodium fluoride, sodium acid fluoride, ammonium fluoride, ammonium acid fluoride, potassium fluoride, potassium acid fluoride, said fluxing agent being within substantially the range specified by weight of from 20 to 55%.

2. A soldering and coating material for aluminum consisting essentially of the following combination of materials within the approximate ranges specified, by weight:

| | Percent |
|---|---|
| Bonding metal consisting essentially of zinc and one or more alloying metals selected from the group consisting of copper, aluminum and magnesium and having the characteristic of a melting point within the range of from substantially 750° F. to 1500° F. and readily bonding with aluminum | 15 to 60 |
| Aliphatic ketone of a molecular wt of approximately 86 or less | 9 to 50 |
| Fluxing agent comprising a zinc halide, an ammonium halide selected from the group consisting of chlorine, iodine, and bromine; and a fluorine salt selected from the group consisting of sodium fluoride, sodium acid fluoride, ammonium fluoride, ammonium acid fluoride, potassium fluoride, potassium acid fluoride and having an affinity for aluminum oxide | 20 to 55 |

3. A soldering and coating material for aluminum consisting essentially of the following combination of materials within the approximate ranges specified by weight:

| | Percent |
|---|---|
| Zinc | 15 to 50 |
| Copper | .5 to 1.5 |
| Aluminum | 0 to 4.0 |
| Magnesium | 0 to 1.5 |
| Methyl ethyl ketone | 9 to 50 |
| Zinc chloride | 20 to 45 |
| Ammonium chloride | 2 to 5 |
| Potassium acid fluoride | .5 to 10 |

4. A soldering and coating material for aluminum consisting essentially of the following combination of materials within the approximate ranges specified by weight:

| | Percent |
|---|---|
| Zinc | 15 to 38.8 |
| Copper | .5 to 1.2 |
| Methyl ethyl ketone | 9 to 20.0 |
| Zinc chloride | 20 to 35.2 |
| Ammonium chloride | 2 to 3.8 |
| Potassium acid fluoride | .5 to 1.0 |

5. A soldering and coating material for aluminum consisting essentially of the following combination of materials within the approximate ranges specified by weight:

| | Percent |
|---|---|
| Zinc | 15 to 36.5 |
| Copper | .5 to 1.2 |
| Magnesium | 0 to 1.5 |
| Methyl ethyl ketone | 9 to 21.0 |
| Zinc chloride | 20 to 35.0 |
| Ammonium chloride | 2 to 3.8 |
| Potassium acid fluoride | .5 to 1.0 |

6. A soldering and coating material for aluminum consisting essentially of the following combination of materials within the approximate ranges specified by weight:

| | Percent |
|---|---|
| Zinc | 15 to 32.5 |
| Copper | .5 to 1.2 |
| Aluminum | 0 to 4.0 |
| Magnesium | 0 to 1.5 |
| Methyl ethyl ketone | 9 to 21.0 |
| Zinc chloride | 20 to 35.0 |
| Ammonium chloride | 2 to 3.8 |
| Potassium acid fluoride | .5 to 1.0 |

7. A soldering and coating material for aluminum consisting essentially of the following combination of materials within the approximate ranges specified by weight:

| | Percent |
|---|---|
| Zinc | 15 to 38.8 |
| Copper | .5 to 1.2 |
| Diethyl ketone | 9 to 20.0 |
| Zinc chloride | 20 to 35.2 |
| Ammonium chloride | 2 to 3.8 |
| Potassium acid fluoride | .5 to 1.0 |

8. A soldering and coating material for aluminum consisting essentially of the following combination of materials within the approximate ranges specified by weight:

| | Percent |
|---|---|
| Zinc | 15 to 34 |
| Copper | .5 to 1.2 |
| Aluminum | 0 to 4.0 |
| Methyl ethyl ketone | 9 to 21.0 |
| Zinc chloride | 20 to 35.0 |
| Ammonium chloride | 2 to 3.8 |
| Potassium acid fluoride | 1.0 |

9. A soldering and coating material for aluminum consisting essentially of the following combination of materials within the approximate ranges specified by weight:

| | Percent |
|---|---|
| Zinc | 15 to 46.34 |
| Copper | .5 to 1.43 |
| Methyl ethyl ketone | 9 to 23.8 |
| Zinc chloride | 20 to 25.0 |
| Ammonium chloride | 2 to 2.71 |
| Potassium acid fluoride | .5 to .72 |

10. A soldering and coating material for aluminum consisting essentially of the following combination of materials within the approximate ranges specified by weight:

| | Percent |
|---|---|
| Zinc | 15 to 27.85 |
| Copper | .5 to .84 |
| Methyl ethyl ketone | 9 to 23.8 |
| Zinc chloride | 20 to 41.8 |
| Ammonium chloride | 2 to 4.52 |
| Potassium acid fluoride | .5 to 1.19 |

11. A soldering and coating material for aluminum consisting essentially of the following combination of materials within the approximate ranges specified by weight:

| | Percent |
|---|---|
| Zinc | 15 to 19.4 |
| Copper | .5 to .6 |
| Methyl ethyl ketone | 9 to 40.0 |
| Zinc chloride | 20 to 35.2 |
| Ammonium chloride | 2 to 3.8 |
| Potassium acid fluoride | .5 to 1.0 |

12. A soldering and coating material for aluminum consisting essentially of the following combination of materials within the approximate ranges specified by weight:

| | Percent |
|---|---|
| Zinc | 15 to 44.10 |
| Copper | .5 to 1.36 |
| Methyl ethyl ketone | 9 to 9.08 |
| Zinc chloride | 20 to 40.0 |
| Ammonium chloride | 2 to 4.32 |
| Potassium acid fluoride | 5 to 9.08 |

References Cited in the file of this patent
UNITED STATES PATENTS 2,493,372     Williams     Jan. 3, 1950